(12) United States Patent
Buttimer et al.

(10) Patent No.: US 11,007,827 B2
(45) Date of Patent: May 18, 2021

(54) TIRE-PRESSURE-MONITORING SYSTEM

(71) Applicant: Ford Global Technologies, LLC, Dearborn, MI (US)

(72) Inventors: Ryan Buttimer, Ann Arbor, MI (US); Robert Henry Camilleri, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 302 days.

(21) Appl. No.: 16/020,626

(22) Filed: Jun. 27, 2018

(65) Prior Publication Data

US 2020/0001668 A1  Jan. 2, 2020

(51) Int. Cl.
*B60C 23/04* (2006.01)
*G01L 17/00* (2006.01)
*B60C 29/02* (2006.01)

(52) U.S. Cl.
CPC ...... *B60C 23/0408* (2013.01); *B60C 23/0494* (2013.01); *B60C 29/02* (2013.01); *G01L 17/00* (2013.01)

(58) Field of Classification Search
None
See application file for complete search history.

(56) References Cited

U.S. PATENT DOCUMENTS

| | | | | |
|---|---|---|---|---|
| 3,185,785 | A * | 5/1965 | Howard | B60C 23/0408 200/61.25 |
| 5,071,259 | A * | 12/1991 | Metzger | B60C 23/0408 374/143 |
| 7,669,466 | B2 | 3/2010 | Ray et al. | |
| 7,694,557 | B2 | 4/2010 | Hettle et al. | |
| 9,499,016 | B2 | 11/2016 | Deniau et al. | |
| 2006/0021426 | A1 * | 2/2006 | Pozzi | B60C 23/0494 73/146.8 |
| 2006/0125612 | A1 * | 6/2006 | Okubo | F16K 15/20 340/445 |
| 2006/0173648 | A1 * | 8/2006 | Chang | B60C 23/0408 702/138 |
| 2006/0288924 | A1 | 12/2006 | Katou et al. | |
| 2008/0083272 | A1 * | 4/2008 | Katou | B60C 23/0494 73/146.8 |
| 2009/0007649 | A1 * | 1/2009 | Kempf | B60C 23/0408 73/146.8 |
| 2015/0273957 | A1 * | 10/2015 | Kempf | B60C 23/0496 73/146.8 |

FOREIGN PATENT DOCUMENTS

CN  202038125 U  11/2011
CN  104494372 A  4/2015

* cited by examiner

*Primary Examiner* — Jill E Culler
(74) *Attorney, Agent, or Firm* — Raymond L. Coppiellie; Bejin Bieneman PLC

(57) ABSTRACT

A tire-pressure-monitoring system includes a flexible member including a stem and a bulb, a metal tube disposed coaxially in the stem, an attachment member, and a sensor housing fixed to the attachment member. The bulb includes an outer circumferential surface including a groove. The attachment member is adjacent the outer circumferential surface and includes a rib positioned in the groove.

18 Claims, 2 Drawing Sheets

TIRE-PRESSURE-MONITORING SYSTEM

BACKGROUND

A tire-pressure-monitoring system (TPMS) is a system for monitoring the air pressure of tires of a vehicle. When the TPMS detects that one of the tires of the vehicle is improperly inflated, an indicator light on the instrument panel illuminates to warn a driver about the tire. TPMS may be indirect or direct.

Indirect TPMS monitors information available outside of the tire to indirectly determine the air pressure. Some indirect TPMS relies on individual rotational speeds of the tires. If one tire is rotating faster than the other tires, then the tire has a smaller diameter and thus is likely underinflated.

Direct TPMS uses pressure sensors mounted either inside or on an outer surface of each tire. Pressure sensors mounted inside the tires communicate using wireless short-range signals.

DETAILED DESCRIPTION

Figure 1:
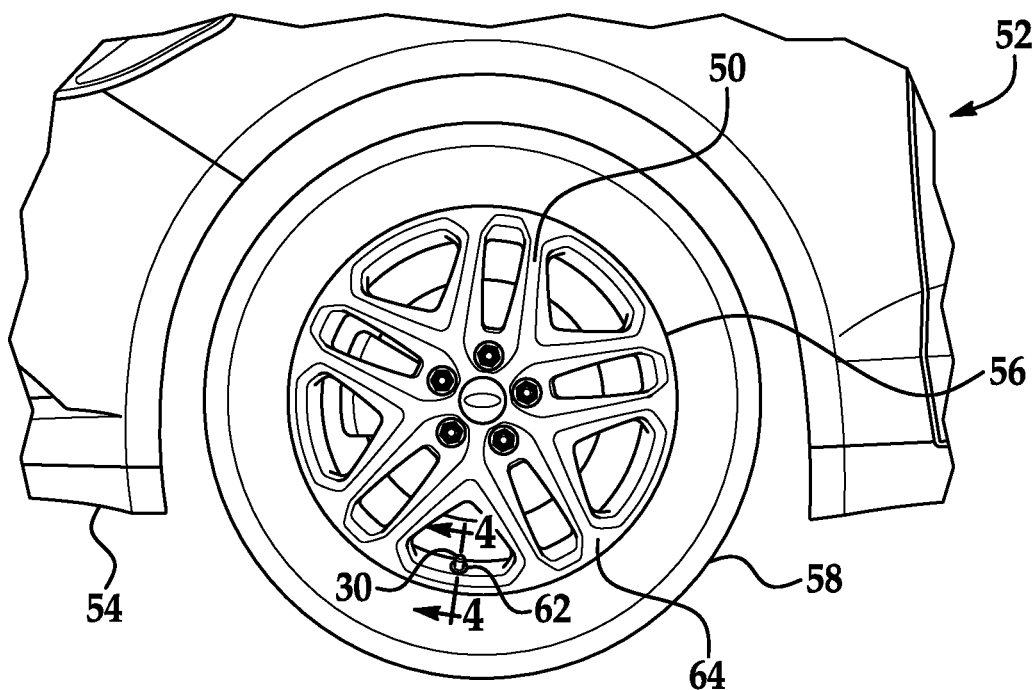
FIG. 1 is a side view of an example wheel and tire of a vehicle.

A tire-pressure-monitoring system includes a flexible member including a stem and a bulb, a metal tube disposed coaxially in the stem, an attachment member, and a sensor housing fixed to the attachment member. The bulb includes an outer circumferential surface including a groove. The attachment member is adjacent the outer circumferential surface and includes a rib positioned in the groove.

The metal tube may be elongated from a first end in the stem away from the bulb to a second end outside the stem. The first end of the metal tube may be axially spaced from the attachment member.

The attachment member may define a cup receiving the bulb, and the rib may extend into the cup. The rib may extend circumferentially about the cup.

The attachment member and the sensor housing may be integral.

The attachment member may extend circumferentially about the outer circumferential surface.

The groove may extend circumferentially 360° about the bulb. The rib may extend circumferentially 360° about the bulb in the groove.

The bulb may include a bore, and the attachment member may include a port in fluid communication with the bore and extending away from the bulb. The attachment member may include a plurality of ports including the port, and the ports may be in fluid communication with the bore and extend away from the bulb.

The flexible member may define an axis, and the port may extend radially away from the axis.

The flexible member may define an axis, and the port may extend axially.

The groove may be a first groove, the flexible member may include a second groove between the stem and the bulb, and the second groove may be shaped to fit in a wheel-rim bore.

The metal tube may include a tube bore, the bulb may include a bulb bore open to the tube bore, and a diameter of the bulb bore may be greater than a diameter of the tube bore.

The stem may include a stem bore, the bulb may include a bulb bore open to the tube bore, and a diameter of the bulb bore may be greater than a diameter of the stem bore. The metal tube may extend into the bulb bore.

The tire-pressure-monitoring system may further include a TPMS sensor disposed in the sensor housing.

The tire-pressure-monitoring system may further include a wheel rim including a bore, and the flexible member may be disposed in the bore with the stem outboard from the bore and the bulb inboard from the bore.

A tire-pressure-monitoring system 30 includes a flexible member 32 including a stem 34 and a bulb 36, a metal tube 38 disposed coaxially in the stem 34, an attachment member 40, and a sensor housing 42 fixed to the attachment member 40. The bulb 36 includes an outer circumferential surface 44 including a groove 46. The attachment member 40 is adjacent the outer circumferential surface 44 and includes a rib 48 positioned in the groove 46.

The tire-pressure-monitoring system 30 is easy to assemble and robust in use. The components of the tire-pressure-monitoring system 30 fit together and are installed to a wheel rim 50 of a vehicle 52 without the use of fasteners, which reduces cost and saves assembly time. The arrangement of the components of the tire-pressure-monitoring system 30 reduces centrifugal pressure on the flexible member 32 while the wheel rim 50 rotates, which increases the durability and lifespan of the flexible member 32. The flexible member 32 may thus be made of less expensive materials, further reducing cost.

Figure 2:
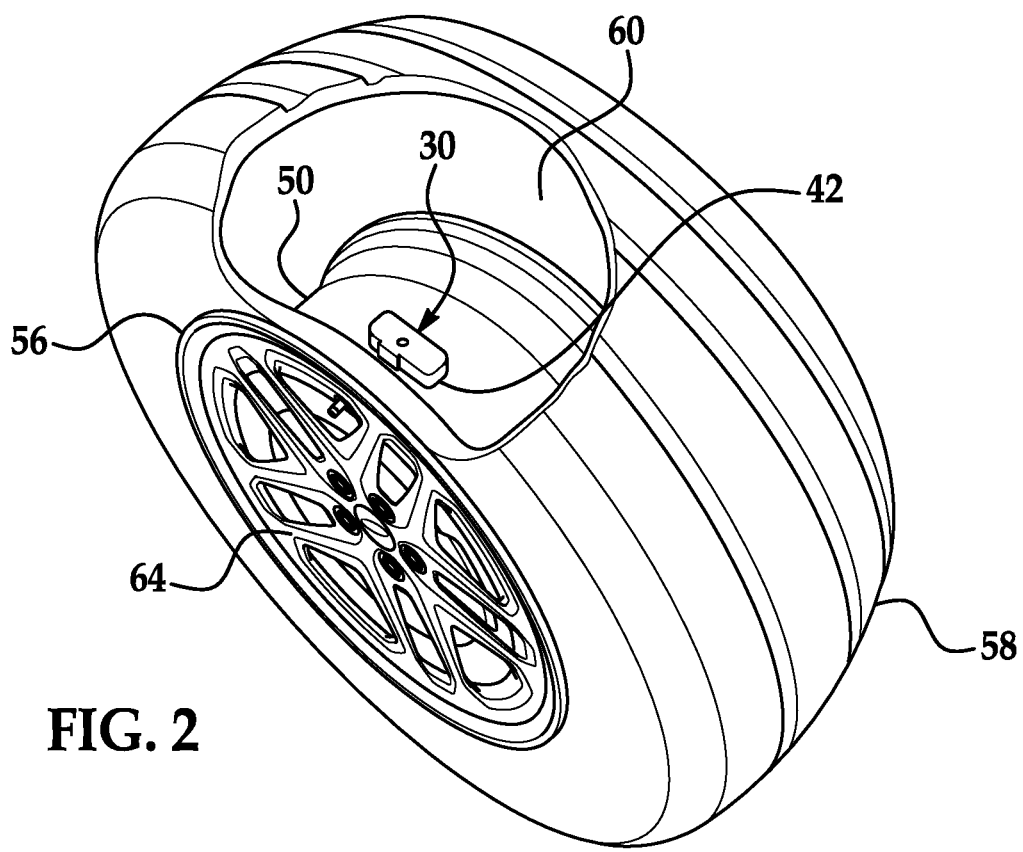
FIG. 2 is a perspective view of the wheel and tire of FIG. 1 with a portion of the tire removed for illustration.

With reference to FIGS. 1 and 2, the tire-pressure monitoring system may be mounted to the wheel rim 50 of the vehicle 52. The wheel rim 50 is rotatable relative to a body 54 of the vehicle 52. The wheel rim 50 is radially symmetric and includes two radially symmetric flanges 56 for mounting a tire 58. The wheel rim 50 may be formed of a nonflexible material, e.g., a metal such as steel or aluminum.

The tire 58 is an inflatable ring mounted to the wheel rim 50 of the vehicle 52. The tire 58 provides shock absorption and traction. The tire 58 and the wheel rim 50 define a toroidally shaped inflation chamber 60 that may be filled with pressurized inflation medium, such as air. The inflation chamber 60 has a toroidal shape. The tire 58 may be formed of synthetic or natural rubber, or other elastomeric materials that provide sufficient elasticity, durability, and grip. The tire 58 may also include cords (not shown) running through the elastomeric material and/or chemical compounds added to the elastomeric material.

The wheel rim 50 includes a wheel-rim bore 62. The tire-pressure-monitoring system 30 is mounted through the wheel-rim bore 62. The wheel-rim bore 62 extends from an outboard face 64 of the wheel rim 50 to the inflation chamber 60. For the purposes of this disclosure, "outboard" is defined as a direction away from a longitudinal centerline of the vehicle 52 or a direction that would be away from the longitudinal centerline of the vehicle 52 if the tire-pressure-monitoring system 30 were installed to the wheel rim 50, and "inboard" is defined as a direction toward the longitudinal centerline of the vehicle 52 or a direction that would be toward the longitudinal centerline of the vehicle 52 if the tire-pressure-monitoring system 30 were installed to the wheel rim 50. The wheel-rim bore 62 is spaced from the tire 58. The wheel-rim bore 62 is sized so that mounting the tire-pressure-monitoring system 30 seals the inflation chamber 60.

Figure 3:
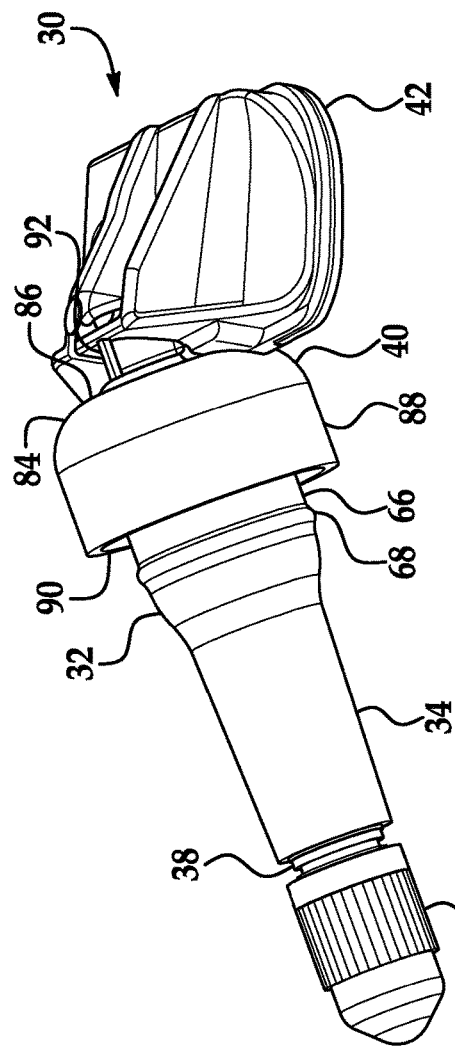
FIG. 3 is a perspective view of a tire-pressure-monitoring system for the wheel and tire of FIG. 1.
Figure 4:
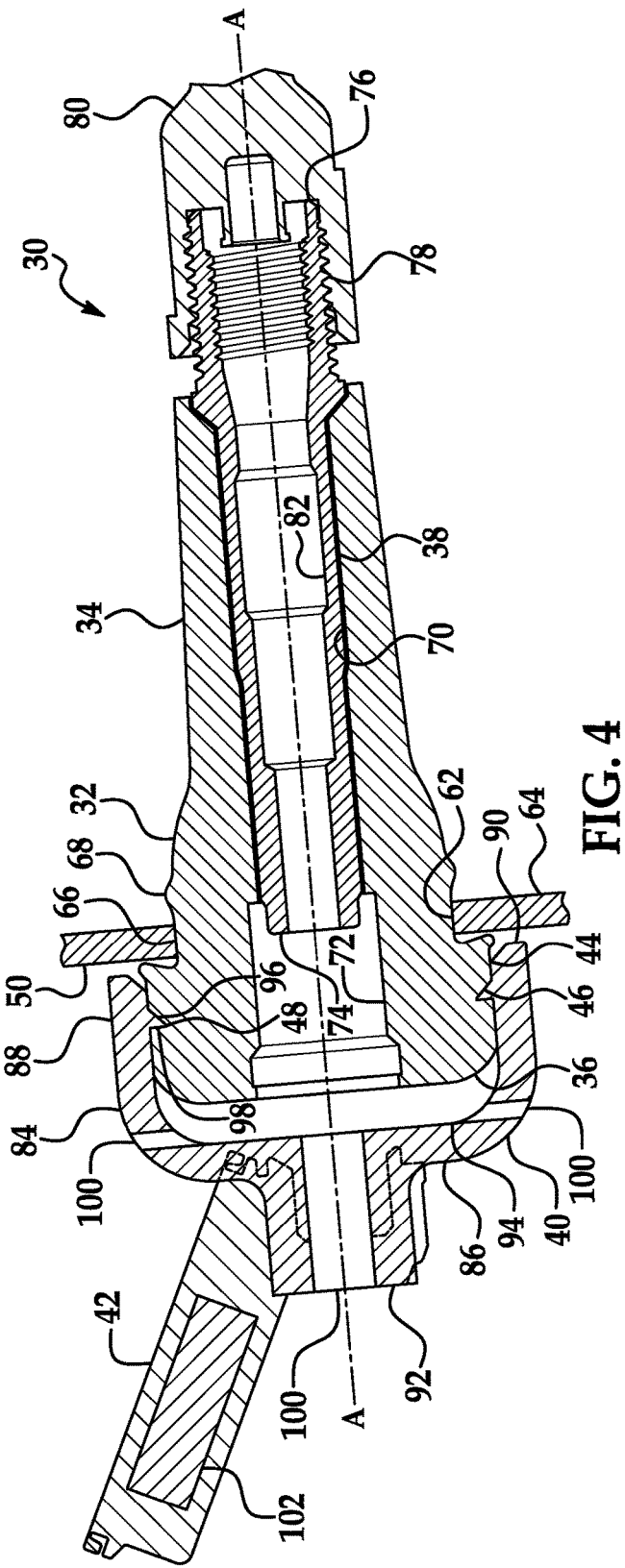
FIG. 4 is a cross-sectional view of the tire-pressure-monitoring system of FIG. 3.

With reference to FIGS. 3 and 4, the flexible member 32 includes the stem 34 and the bulb 36. The flexible member 32 defines an axis A. The flexible member 32 is radially symmetric about the axis A. The flexible member 32 may be formed of synthetic or natural rubber or another elastomeric material. The flexible member 32 may be integral. For the purposes of this disclosure, "integral" is defined as made of a single, uniform piece of material with no seams, joints, fasteners, or adhesives holding it together.

The flexible member 32 includes a second groove 66 between the stem 34 and the bulb 36. The second groove 66 is shaped to fit in the wheel-rim bore 62, i.e., has a diameter approximately equal to the diameter of the wheel-rim bore 62. The bulb 36 has an outer diameter greater than the diameter of the second groove 66. The stem 34 includes a lip 68 adjacent the second groove 66 and having a diameter greater than the diameter of the second groove 66. The flexible member 32 is mounted to the wheel rim 50 by the second groove 66. The flexible member 32 is disposed in the wheel-rim bore 62 with the stem 34 outboard from the wheel-rim bore 62 and the bulb 36 inboard from the wheel-rim bore 62. The stem 34 is disposed outboard of the outboard face 64 of the wheel rim 50. The bulb 36 is disposed in the inflation chamber 60.

The stem 34 has a tubular shape and is elongated along the axis A. The stem 34 is tapered, i.e., has a decreasing outer diameter, along the axis A in the outboard direction, i.e., in the direction away from the bulb 36. The stem 34 includes a stem bore 70 elongated along the axis A. The stem bore 70 extends for the full length of the stem 34. The stem bore 70 is open at both ends.

The bulb 36 has a tubular shape and is elongated along the axis A. The bulb 36 includes the outer circumferential surface 44. The outer circumferential surface 44 extends axially along the axis A and circumferentially about the axis A. The bulb 36 includes a bulb bore 72. One end of the stem bore 70 is open to the bulb bore 72. The bulb bore 72 is elongated along the axis A. The diameter of the bulb bore 72 is greater than the diameter of the stem bore 70.

The outer circumferential surface 44 includes the groove 46. The groove 46 extends into the bulb 36, i.e., extends radially toward the axis A from the outer circumferential surface 44. The groove 46 extends circumferentially 360° about the bulb 36. The groove 46 is shaped to accept the rib 48.

The metal tube 38 is elongated from a first end 74 to a second end 76. The metal tube 38 includes threads 78 near the second end 76 for receiving a cap 80. The threads 78 are closer to the second end 76 than to the first end 74. The metal tube 38 has a tubular shape. The metal tube 38 includes a tube bore 82. The tube bore 82 extends from the first end 74 to the second end 76 of the tube. The size and shape of the metal tube 38 may follow standards promulgated by the Tire and Rim Association, Inc. and/or the European Tyre and Rim Technical Organisation. The metal tube 38 may be a copper alloy such as brass.

The metal tube 38 is elongated along the axis A. The metal tube 38 is disposed coaxially in the stem 34. The metal tube 38 is flush with the stem bore 70 along the axis A, and the fit of the metal tube 38 in the stem bore 70 prevents air from passing between the stem bore 70 and the metal tube 38. The outer diameter of the metal tube 38 is approximately equal to the diameter of the stem bore 70 along the axis A. The first end 74 of the metal tube 38 is disposed in the stem 34 away from the bulb 36, and the first end 74 of the tube is axially spaced from the attachment member 40. The first end 74 of the metal tube 38 extends out of the stem bore 70 and into the bulb bore 72. The position of the first end 74 of the metal tube 38 can reduce pressure on the second groove 66 against the wheel-rim bore 62. The second end 76 of the metal tube 38 is disposed outside the stem 34, specifically, outboard from the flexible member 32 along the axis A. The tube bore 82 is open to the bulb bore 72 at the first end 74 of the metal tube 38, and the tube bore 82 is sealed by the cap 80 at the second end 76 of the metal tube 38. The tube bore 82 is in fluid communication with the bulb bore 72. For the purposes of this disclosure, "fluid communication" is defined as permitting a fluid, i.e., a gas or a liquid, to flow from one to the other.

The attachment member 40 defines a cup 84. The attachment member 40 includes a back wall 86 and a side wall 88 defining the cup 84. The back wall 86 may be generally flat and may be orthogonal to the axis A. The side wall 88 has a tubular shape that is elongated along the axis A from the back wall 86 to an open end 90. The open end 90 has a tapered inside edge. The side wall 88 extends about the axis A for 360°. The outer diameter of the side wall 88 is greater than the outer diameter of the bulb 36, i.e., the diameter of the outer circumferential surface 44. The inner diameter of the side wall 88 is approximately equal to or less than the outer diameter of the bulb 36. The attachment member 40 includes a sensor-attachment protrusion 92. The sensor-attachment protrusion 92 may extend axially inboard from the back wall 86.

The attachment member 40 is positioned about the bulb 36. The attachment member 40, e.g., the cup 84 shape of the attachment member 40, receives the bulb 36. The attachment member 40, specifically the side wall 88, extends circumferentially about the outer circumferential surface 44. The attachment member 40, specifically the side wall 88, is adjacent the outer circumferential surface 44. That the attachment member 40 has a greater outer diameter than the bulb 36 can make assembly of the tire-pressure-monitoring system 30 easier because it is easier to locate the bulb 36 in the cup 84. The tapered inside edge of the open end 90 can also make locating the bulb 36 in the cup 84 easier. That the attachment member 40 may have a smaller inner diameter than outer diameter of the bulb 36 can create an interference fit, which obviates the need for fasteners or adhesives to attach the attachment member 40 to the bulb 36. The back wall 86 is spaced from the bulb 36. The attachment member 40 and the bulb 36 define a cup chamber 94, and the cup chamber 94 is open to the bulb bore 72. The cup chamber 94 and the bulb bore 72 are in fluid communication. More specifically, the bulb 36, the back wall 86, and the side wall 88 between the bulb 36 and the back wall 86 define the cup chamber 94.

The attachment member 40 includes the rib 48. The rib 48 extends into the cup 84 and extends circumferentially about the cup 84. The rib 48 extends along an inside of the side wall 88. The rib 48 extends about the axis A. The rib 48 extends 360° about the bulb 36. The rib 48 extends radially inward from the side wall 88 of the attachment member 40, i.e., toward the axis A. The rib 48 is positioned in the groove 46.

The rib 48 includes a slipping surface 96 and a catching surface 98. The slipping surface 96 is outboard of the catching surface 98. The slipping surface 96 may form an obtuse angle with the side wall 88 extending away from the rib 48, and the catching surface 98 may form a right angle or an acute angle with the side wall 88 extending away from the rib 48. The slipping surface 96 may extend from the side wall 88 in a radially inward and inboard direction. The catching surface 98 may extend from the side wall 88 in a radially inward direction or in a radially inward and inboard direction.

The attachment member 40 includes a plurality of ports 100 in fluid communication with the cup chamber 94, the bulb bore 72, and the tube bore 82. The ports 100 extend through the attachment member 40 from the inflation chamber 60 to the cup chamber 94. The ports 100 extend away from the bulb 36 from the cup chamber 94 through the attachment member 40 to the inflation chamber 60. For example, the ports 100 may include a port 100 extending axially through the back wall 86 and the sensor-attachment protrusion 92 of the attachment chamber and two ports 100 extending radially away from the axis A through the side wall 88 of the attachment member 40. The port 100 extending axially may have a larger diameter than the ports 100 extending radially.

The sensor housing 42 is fixed to the attachment member 40, e.g., to the sensor-attachment protrusion 92. The sensor housing 42 extends inboard from the attachment member 40. The sensor housing 42 may be attached to the attachment member 40 via a press fit, snaps, adhesive, fasteners, etc. Alternatively, the attachment member 40 and the sensor housing 42 may be integral. For the purposes of this disclosure, "integral" is defined as made of a single, uniform piece of material with no seams, joints, fasteners, or adhesives holding it together.

A tire-pressure-monitoring-system (TPMS) sensor 102 is disposed in the sensor housing 42. The TPMS sensor 102 may be a direct TPMS sensor, i.e., a pressure sensor. The TPMS sensor 102 is positioned to monitor the pressure of the inflation chamber 60. The TPMS sensor 102 may communicate using wireless short-range signals with a communications network and a controller (not shown) of the vehicle 52. The controller may output a warning if the pressure sensed by the TPMS sensor 102 is below a threshold. The warning may be, e.g., sounding a chime and illuminating an indicator light.

To assemble the tire-pressure-monitoring system 30, the flexible member 32 may be formed as a single piece. The sensor housing 42 may be attached to the attachment member 40, or the sensor housing 42 and the attachment member 40 may be formed as a single piece. The metal tube 38 is inserted into the stem bore 70. The attachment member 40 is snapped over the bulb 36 with the rib 48 engaging the groove 46. The flexible member 32 is inserted through the wheel-rim bore 62 stem 34 first in an outboard direction, and the lip 68 snaps over the wheel-rim bore 62. The lip 68 and the bulb 36 hold the flexible member 32 in place in the wheel-rim bore 62. The tire-pressure-monitoring system 30 is attached to the wheel rim 50 without using fasteners. The cap 80 is screwed onto the threads 78 of the metal tube 38.

In operation, the TPMS sensor 102 continuously or periodically transmits data representing the pressure of the inflation chamber 60 to the controller. While the vehicle 52 is traveling, the wheel rotates, and the rotational momentum pushes the tire-pressure-monitoring system 30 radially away from the center of the wheel rim 50 against the edge of the wheel-rim bore 62. The engagement of the metal tube 38 with the stem bore 70 is entirely outside, e.g., outboard, of the wheel-rim bore 62, which reduces pressure on the flexible member 32 from the wheel-rim bore 62 compared to a system in which the metal tube 38 extends through the wheel-rim bore 62.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A tire-pressure-monitoring system comprising:
    a flexible member including a stem and a bulb, the bulb including an outer circumferential surface including a first groove;
    a metal tube disposed coaxially in the stem;
    an attachment member adjacent the outer circumferential surface and including a rib positioned in the first groove; and
    a sensor housing fixed to the attachment member;
    wherein the bulb includes a bore;
    the attachment member includes a plurality of ports;
    each port is in fluid communication with the bore, extends away from the bulb, and is open to an exterior of the attachment member;
    the flexible member includes a second groove between the stem and the bulb;
    the second groove is shaped to fit in a wheel-rim bore; and
    the second groove is spaced from the first groove.

2. The tire-pressure-monitoring system of claim 1, wherein the metal tube is elongated from a first end in the stem away from the bulb to a second end outside the stem.

3. The tire-pressure-monitoring system of claim 2, wherein the first end of the metal tube is axially spaced from the attachment member.

4. The tire-pressure-monitoring system of claim 1, wherein the attachment member defines a cup receiving the bulb, and the rib extends into the cup.

5. The tire-pressure-monitoring system of claim 4, wherein the rib extends circumferentially about the cup.

6. The tire-pressure-monitoring system of claim 1, wherein the attachment member and the sensor housing are integral.

7. The tire-pressure-monitoring system of claim 1, wherein the attachment member extends circumferentially about the outer circumferential surface.

8. The tire-pressure-monitoring system of claim 1, wherein the first groove extends circumferentially 360° about the bulb.

9. The tire-pressure-monitoring system of claim 8, wherein the rib extends circumferentially 360° about the bulb in the first groove.

10. The tire-pressure-monitoring system of claim 1, wherein the flexible member defines an axis, and at least one of the ports extends radially away from the axis.

11. The tire-pressure-monitoring system of claim 1, wherein the flexible member defines an axis, and at least one of the ports extends axially.

12. The tire-pressure-monitoring system of claim 1, wherein the bore is a bulb bore, the metal tube includes a tube bore, the bulb bore is open to the tube bore, and a diameter of the bulb bore is greater than a diameter of the tube bore.

13. The tire-pressure-monitoring system of claim 1, wherein the bore is a bulb bore, the stem includes a stem bore, the bulb bore is open to the tube bore, and a diameter of the bulb bore is greater than a diameter of the stem bore.

14. The tire-pressure-monitoring system of claim 13, wherein the metal tube extends into the bulb bore.

15. The tire-pressure-monitoring system of claim 1, further comprising a TPMS sensor disposed in the sensor housing.

16. The tire-pressure-monitoring system of claim 1, wherein a portion of the outer circumferential surface is positioned axially between the first groove and the second groove.

17. A tire-pressure-monitoring system comprising:
- a flexible member including a stem and a bulb, the bulb including an outer circumferential surface including a groove, the flexible member defining an axis;
- a metal tube disposed coaxially in the stem;
- an attachment member including a side wall adjacent the outer circumferential surface, a back wall spaced axially from the bulb, and a rib positioned in the groove; and
- a sensor housing fixed to the attachment member;
- wherein the bulb includes a bore;
- the attachment member and the bulb define a cup chamber extending axially from the bulb to the back wall;
- the cup chamber is open to the bore; and
- the attachment member includes a port in fluid communication with the bore via the cup chamber and extending axially away from the bulb to an exterior of the attachment chamber.

18. The tire-pressure-monitoring system of claim 17, wherein the port is a first port, the attachment member includes a second port in fluid communication with the bore via the cup chamber and extending radially away from the axis to the exterior of the attachment chamber.

* * * * *